(12) United States Patent
Martinez et al.

(10) Patent No.: US 10,024,222 B2
(45) Date of Patent: Jul. 17, 2018

(54) DIRECT-INJECTION INTERNAL-COMBUSTION ENGINE WITH DUAL SHEET ANGLE FOR PRODUCING A FUEL MIXTURE IN A COMBUSTION CHAMBER WITH DUAL COMBUSTION ZONE AND LOW COMPRESSION RATIO, AND METHOD FOR USING SAME

(71) Applicant: IFP Energies nouvelles, Rueil-Malmaison (FR)

(72) Inventors: Lionel Martinez, Vaulnaveys le Bas (FR); Stéphane Richard, Bazainville (FR); Olivier Laget, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/306,434

(22) PCT Filed: Apr. 8, 2015

(86) PCT No.: PCT/EP2015/057594
§ 371 (c)(1),
(2) Date: Oct. 24, 2016

(87) PCT Pub. No.: WO2015/162005
PCT Pub. Date: Oct. 29, 2015

(65) Prior Publication Data
US 2017/0051657 A1    Feb. 23, 2017

(30) Foreign Application Priority Data
Apr. 24, 2014  (FR) .................................. 14 53660

(51) Int. Cl.
*F02B 23/06*    (2006.01)

(52) U.S. Cl.
CPC ......... *F02B 23/0669* (2013.01); *Y02T 10/125* (2013.01)

(58) Field of Classification Search
CPC .......... F02B 1/12; F02B 9/02; F02B 23/0624; F02B 23/0651; F02B 23/0669;
(Continued)

(56) References Cited

U.S. PATENT DOCUMENTS 6,138,639 A * 10/2000 Hiraya ...................... F01L 3/06
                                                     123/295
7,185,614 B2 * 3/2007 Meffert ............... F02B 23/0672
                                                     123/269
(Continued)

FOREIGN PATENT DOCUMENTS

EP    2615296 A1    7/2016
FR    2 887 586 A1    12/2006
(Continued)

OTHER PUBLICATIONS

International Search Report for PCT/EP2015/057594 dated May 22, 2015; English translation submitted herewith (7 pages).

*Primary Examiner* — John Kwon
*Assistant Examiner* — Johnny H Hoang
(74) *Attorney, Agent, or Firm* — Fitch, Even, Tabin & Flannery LLP

(57) ABSTRACT

The present invention relates to a compression-ignition direct-injection internal-combustion engine with a compression ratio ranging between 13.5 and 16.5 including a combustion chamber limited on one side by upper face (44) of a piston (16) comprising a projection (48) arranged in the center of a concave bowl (46) with at least two mixing zones (Z1, Z2), a fuel injection comprising at least one injector (30) projecting fuel in at least two fuel jet sheets (36, 38) with different sheet angles (A1, A2). The fuel injector comprises two rows of injection orifices (33a, 33b) arranged (Continued)

one above the other with the number of orifices of each row (Ninf, Nsup) is greater than or equal to $-4 \cdot Ns+14$ and less than or equal to $-4 \cdot Ns+16$ for the lower sheet or $-4 \cdot Ns+18$ for the upper sheet. Ns is the swirl number of this engine with a swirl number less than 1.5.

13 Claims, 4 Drawing Sheets

(58) Field of Classification Search
CPC .............. F02B 23/0672; F02B 23/0687; F02B 23/0693; F02B 23/0696; F02M 61/14; F02M 61/1806; F02M 61/1813; F02M 61/192; F02M 45/086; F02F 1/242; F02F 3/26
USPC ....... 123/275, 276, 290, 294, 298, 301, 305, 123/307
See application file for complete search history.

(56) References Cited

U.S. PATENT DOCUMENTS

| | | | | |
|---|---|---|---|---|
| 9,022,006 | B2* | 5/2015 | Segawa | F02M 29/00 123/299 |
| 9,429,065 | B2* | 8/2016 | Zoeller | F02B 23/0651 |
| 2004/0050982 | A1* | 3/2004 | Sprouse | F23D 11/107 239/596 |
| 2013/0036998 | A1* | 2/2013 | Cornwell | F02B 23/0669 123/193.6 |
| 2016/0265418 | A1 | 9/2016 | Martinez Alvarado et al. | |
| 2017/0082013 | A1* | 3/2017 | Martinez | F02B 23/0669 |
| 2017/0096978 | A1* | 4/2017 | Martinez | F02B 23/0672 |
| 2017/0114730 | A1* | 4/2017 | Laget | F02D 19/0689 |

FOREIGN PATENT DOCUMENTS

| | | |
|---|---|---|
| FR | 3012522 A1 | 5/2015 |
| WO | 2013/016713 A2 | 1/2013 |

* cited by examiner

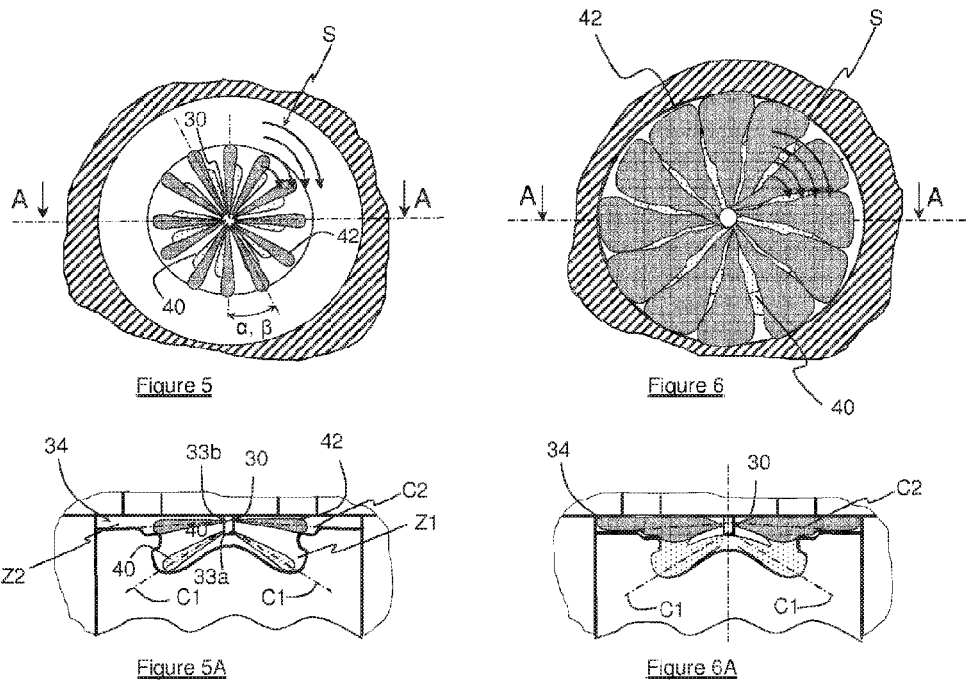
Figure 5  Figure 6
Figure 5A  Figure 6A
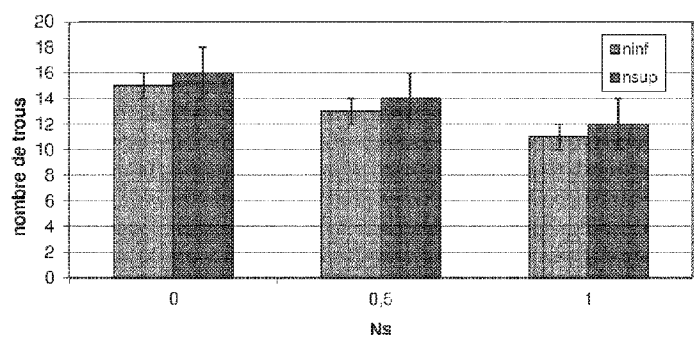
Figure 7

DIRECT-INJECTION INTERNAL-COMBUSTION ENGINE WITH DUAL SHEET ANGLE FOR PRODUCING A FUEL MIXTURE IN A COMBUSTION CHAMBER WITH DUAL COMBUSTION ZONE AND LOW COMPRESSION RATIO, AND METHOD FOR USING SAME

CROSS REFERENCE TO RELATED APPLICATIONS

Reference is made to International Application No. PCT/EP2015/057594 filed Apr. 8, 2015 and French Application No. 14/53.660 filed Apr. 24, 2014, which applications are incorporated herein by reference in their entirety.

BACKGROUND OF THE INVENTION

Field of the Invention

The present invention relates to a direct-injection internal-combustion engine, of compression-ignition engine, and to a method of controlling the fuel injection in such an engine. It more particularly relates to an engine used in the air or road transoirtation, or in the field of stationary equipment such as generating sets.

Description of the Prior Art

This type of engine generally comprises at least a cylinder, a piston provided with a projection arranged in a concave bowl and sliding in the cylinder in a reciprocating rectilinear motion, an intake for an oxidizer, a burnt gas exhaust, a combustion chamber and a fuel injection for injecting fuel into the combustion chamber.

Upon design of an engine, the performance, pollution emission and mechanical strength constraints of the combustion chamber are increasingly high whereas the systems for meeting them are quite the opposite.

Thus, performance increase generally leads to an increase in emissions and to higher mechanical stresses.

It is therefore necessary to overcome these stresses to guarantee limited pollution emissions and satisfactory mechanical strength over the entire operating range of the engine, in particular at very high load. In particular for pollution emissions, using all of the oxidizer present in the combustion chamber, for example an oxidizer comprising air at ambient pressure, supercharged air or a mixture of air (supercharged or not) and of recirculated burnt gas, is of great importance.

Indeed, the fuel mixture (oxidizer/fuel) in the combustion chamber needs to be as homogeneous as possible.

In practice, the fuel remains confined in the bowl and it cannot mix with the oxidizer contained notably in the compression area, that is in the volume located in the upper part of the combustion chamber limited by the cylinder wall and the face of the cylinder head opposite the piston.

This involves the drawback of creating areas of high richness in the combustion chamber, generating a high production of soot, carbon monoxide (CO) and unburnt hydrocarbons (HC) upon combustion of the fuel mixture.

Furthermore, regarding the mechanical strength, the thermal load is focused on the re-entrant part of the piston, that is the bowl neck or diameter restriction that marks the transition between the piston bowl and the upper zone encompassing the compression area, which may be limiting in terms of mechanical strength at very high loads.

To overcome these drawbacks, and as better described in French patent application No. 13/60,426 filed by the applicant, an internal-combustion engine comprising fuel injection with jets having at least two sheet angles and a piston comprising a bowl provided with a projection with two combustion zone volumes and internal aerodynamics substantially improving the combustion quality is provided.

This allows use of a larger amount of oxidizer compared to conventional engines, and to distribute the thermal load over a larger surface area of the combustion chamber.

In this type of engines, mixing of the injected fuel and of the oxidizer, such as air at ambient pressure or supercharged air or a mixture of air (supercharged or not) with recirculated exhaust gas, admitted to the combustion chamber occurs in two stages.

First, upon fuel injection, the oxidizer located on the periphery of the fuel jet is carried along by this jet. Small-scale mixing due to the turbulence generated by this entrainment occurs then.

In order to improve this fuel/oxidizer mixing, a swirling motion of the oxidizer, referred to as swirl, which provides large-scale "stirring" of the unmixed fuel, is used in a second stage. This swirl can be seen as a rotating motion of the oxidizer about an axis substantially parallel to or merged with that of the combustion chamber. This swirl can be obtained by a particular oxidizer intake, such as a specific intake line geometry.

In this configuration, it should however be noted that, while the small-scale mixing performed in the gaseous spray is very quick, the large-scale mixing associated with the swirling motion occurs more slowly.

The performances of the engine, the fuel consumption thereof or the discharge of pollution such as soot, carbon monoxide or unburnt hydrocarbons greatly depends on the capacity for quick mixing of the fuel with the oxidizer.

Optimization of the fuel injection and of the swirl level is therefore generally performed in order to optimize the engine performance.

One option uses a relatively high swirl number, denoted by Ns, of the order of 2 to 3. This number is equal to the ratio of the rotation speed of the swirling motion of the oxidizer to that of the crankshaft.

One drawback of this option is that, for some engine operating points, in particular when the fuel injection pressure is low, or when a large amount of fuel is injected, the fuel jets can be excessively diverted circumferentially, thus causing interaction or even superposition between the various jets.

This phenomenon can significantly increase soot and unburnt hydrocarbon emissions while degrading the combustion efficiency, and therefore the power and the consumption.

SUMMARY OF THE INVENTION

The present invention overcome the aforementioned drawbacks with a method for obtaining better mixing of the oxidizer (gaseous fluid) and of the injected fluid while enabling use of a fuel injection system with at least two sheet angles and a piston whose profile allows the combustion chamber to comprise at least two combustion zones.

The invention therefore relates to a compression-ignition direct-injection internal-combustion engine comprising at least a cylinder, a cylinder head carrying fuel injectors, a piston sliding in this cylinder, a combustion chamber limited on one side by the upper face of the piston comprising a projection extending in the direction of the cylinder head and in the center of a concave bowl with at least two mixing zones including an upper zone and a lower zone, a fuel injection system comprising at least one injector projecting fuel in at least two fuel jet sheets with different sheet angles, a lower sheet of jet axis C1 for a lower zone and an upper sheet of jet axis C2 for an upper zone. The fuel injector comprises at least two rows of injectors arranged one above the other and a number of orifices in each row is greater than or equal to $-4 \cdot Ns+14$ and less than or equal to $-4 \cdot Ns+16$ for a lower row or $-4 \cdot Ns+18$ for one upper row, where Ns is the swirl number of this engine.

The minimum compression ratio can be in the region of 13.5 and the maximum compression ratio can be in the region of 16.5.

The swirl number can preferably be less than 1.5 and more preferably of the order of 1.

The orifices for the fuel jets of a fuel sheet have an angular offset with respect to the orifices for the fuel jets of the other fuel sheet.

The fuel jet sheets each have a different sheet angle.

The invention also relates to a fuel injection method for a compression-ignition direct-injection internal-combustion engine comprising at least a cylinder, a cylinder head carrying fuel injection, a piston sliding in the cylinder, a combustion chamber limited on one side by the upper face of the piston comprising a projection extending in the direction of the cylinder head and in the center of a concave bowl. The method injects the fuel in at least two fuel jet sheets with different sheet angles, a lower sheet of jet axis C1 and an upper sheet of jet axis C2. in the fuel is injected through two rows of injection orifices arranged one above the other with the number of orifices of each row being greater than or equal to $-4 \cdot Ns+14$ and less than or equal to $-4 \cdot Ns+16$ for the lower sheet or $-4 \cdot Ns+18$ for the upper sheet, with Ns being the swirl number of the engine.

BRIEF DESCRIPTION OF THE FIGURES

Other features and advantages of the invention will be clear from reading the description hereafter, given by way of non-limitative example, with reference to the accompanying figures wherein;

FIG. 5 is a variant of FIG. 3 with a local cross-sectional view of the bowl during the initial fuel injection phase;

FIG. 5A is a sectional view along line AA of FIG. 5;

FIG. 6 is another local cross-sectional view of the bowl (of the variant shown in FIG. 5) during the final fuel injection phase;

FIG. 6A is a sectional view along line AA of FIG. 6; and

FIG. 7 is a graph showing the correlation of the number of ports with the swirl number Ns for each one of the two sheets.

DETAILED DESCRIPTION OF THE INVENTION

Figure 1:
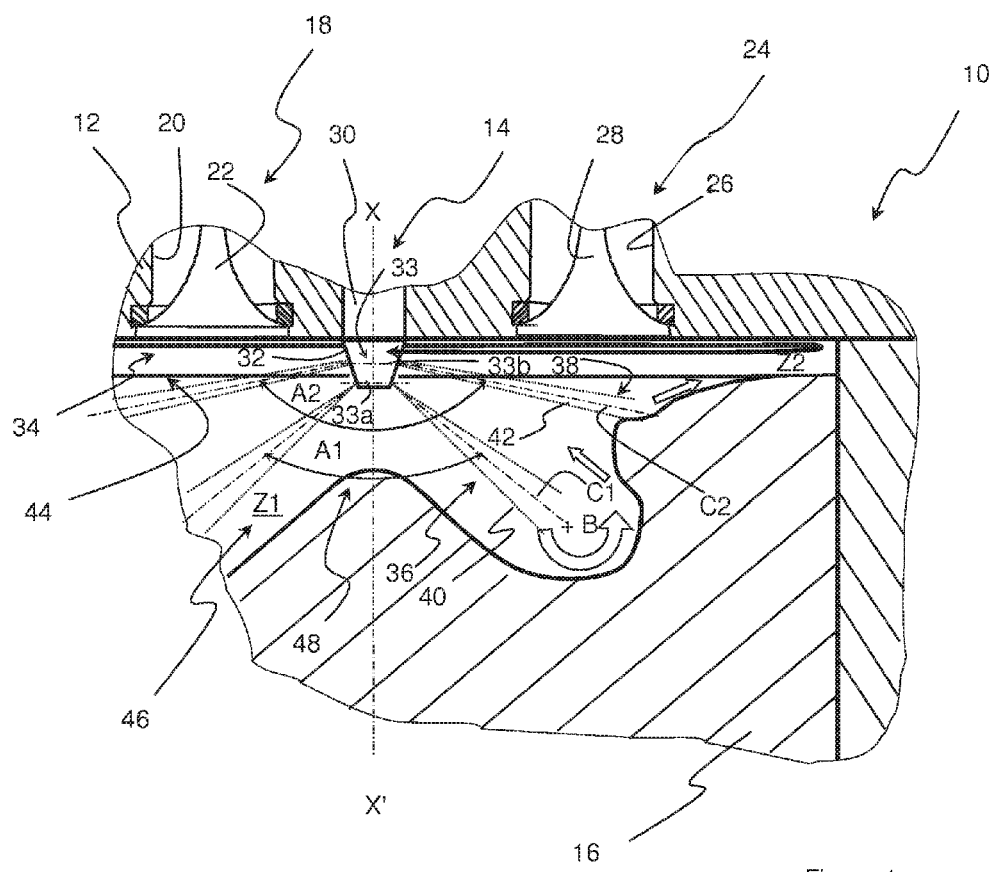
FIG. 1 shows an internal-combustion engine according to the invention.

With reference to FIG. 1, a compression-ignition direct-injection internal-combustion engine with a low compression ratio, preferably ranging between 13.5 and 16.5, comprises at least a cylinder 10, a cylinder head 12 closing the cylinder in the upper part, fuel injection 14 carried by the cylinder head and a piston 16 of axis XX' sliding in the cylinder with a reciprocating rectilinear motion.

Fuel is understood to be a liquid fuel such as diesel fuel, kerosene or any other fuel with the physicochemical characteristics allowing operation of an engine of compression ignition type including a direct injection system for this fuel.

This engine also comprises a burnt gas exhaust 18 with at least one exhaust pipe 20 whose opening can be controlled by any means such as an exhaust valve 22 for example, and an intake 24 for an oxidizer with at least one intake pipe 26 whose opening can be controlled by any mechanism such as an intake valve 28 for example.

The intake is designed for admitting the oxidizer with a predetermined swirl ratio preferably below 1.5. The intake can therefore comprise at least one throttle and the engine can comprise at least one control for actuating the throttling so as to obtain the predetermined swirl ratio preferably below 1.5. The intake can also comprise a specific geometry for intake pipe 26.

The fuel injection comprises at least one fuel injector 30, preferably arranged along axis XX' of the piston, whose nozzle 32 comprises a multiplicity of orifices 33 through which the fuel is sprayed and projected in the direction of combustion chamber 34 of the engine.

It is from these injectors that the projected fuel forms at least two fuel jet sheets, 36 and 38 of fuel jets 40 and 42, which, in the example shown, have a general axis merged with that of piston 16 while being axially positioned one above the other.

More precisely, sheet 36, that is the closer to piston 16, is referred to as lower sheet in the description hereafter, while sheet 38, that is further away from this piston, is referred to as upper sheet.

As can be seen in FIG. 1, these two sheets form different sheet angles A1 and A2. A sheet angle is understood to be the top angle formed by the cone originating from the injector, whose imaginary peripheral wall passes through all the axes C1 or C2 of fuel jets 40 or 42.

Advantageously, sheet angle A1 of the lower sheet preferably ranges between 40° and 105°, while sheet angle A2 of the upper sheet preferably ranges between 155° and 180°.

Figure 2:
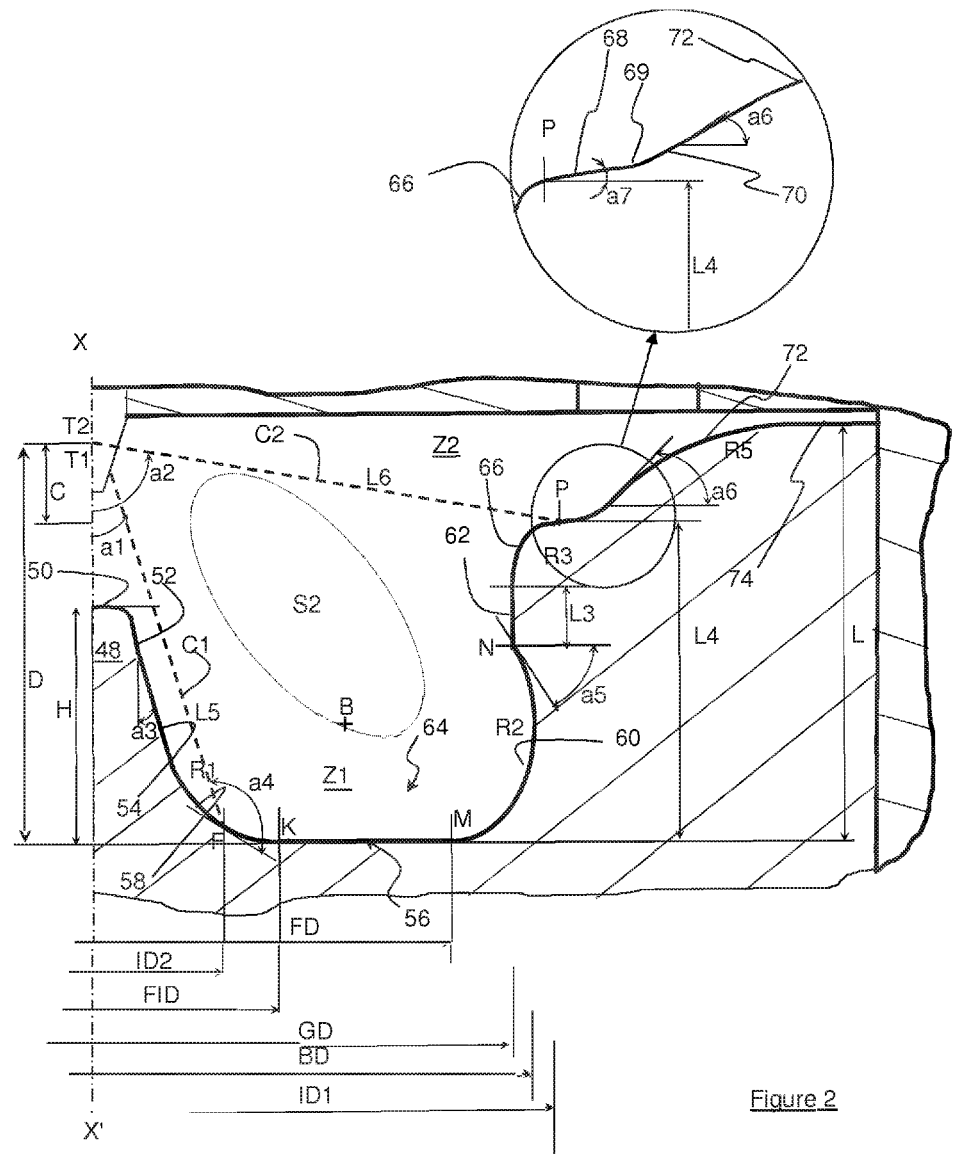
FIG. 2 is a large-scale partial view of a half section of the piston bowl profile of the engine of FIG. 1.

For simplification reasons, in the rest of the description, angle a1 corresponds to A1/2 and angle a2 corresponds to A2/2 as seen in FIG. 2.

Preferably, the difference between angle A1 and angle A2 is greater than or equal to 50°. This allows limiting fuel jet overlaps between the two sheets and therefore formation of pollution such as soot, as well as any interaction between the sheets during processes such as injection and large-scale stirring due to swirl.

This injector configuration also allows the orifices of the two sheets to be positioned one above the other, even though, generally, they are preferably arranged with an angular offset to guarantee the absence of interaction between the jets, as better described in French patent application No. 14/52,119 filed by the applicant.

Of course, it is possible for the fuel injection to not be arranged along axis XX'. In this case, the general axis of the fuel jet sheets from the fuel injector is at least substantially parallel to this axis XX'.

Similarly, it is possible for each sheet to be carried by a distinct injector (single-sheet injector) with dedicated targeting in distinct zones of the combustion chamber.

Combustion chamber 34 is limited by the inner face of cylinder head 12 opposite the piston, the circular inner wall of cylinder 10 and upper face 44 of piston 16.

The upper face 44 of the piston comprises a concave bowl 46, having an axis that is merged with that of the cylinder, whose concavity is directed towards the cylinder head and which houses a projection 48 arranged substantially in the center of the bowl, which rises towards cylinder head 12, while being preferably coaxial with the axis of the fuel sheets from injector 30.

Of course, it is possible for the axis of the bowl to not be coaxial with that of the cylinder. But the main thing is the layout according to which the axis of the fuel jet sheet, the axis of the projection and the axis of the bowl are preferably merged.

Furthermore, with reference to FIG. 2, projection 48, which is generally of truncated shape, comprises preferably a rounded top 50 which extends, symmetrically away from axis XX' towards the outside of piston 16, with a substantially rectilinear inclined surface 52 extending with an inclined flank 54 down to a bottom 56 of the bowl.

Of course, without departing from the scope of the invention, inclined surface 52 can be nonexistent (zero length) with inclined flank 54 connecting the top of the projection 48 to the bottom of the bowl.

In the example of FIG. 2, the bottom of this bowl is rounded, with a concave rounded surface 58 in form of an arc of a circle with radius R1, which is referred to as inner rounded surface, connected to the bottom of inclined flank 54 and another concave rounded surface 60 in form of an arc of a circle with radius R2, which is referred to as outer rounded surface, connected at one end to the lower end of the inner rounded surface at a point M and at the other end thereof to a lateral wall 62, substantially vertical here, at a point N.

The two rounded surfaces 58 and 60 thus limit the lower part of a toroidal volume, which is here a torus of substantially cylindrical section 64 and of center B whose purpose is described in the rest of the description.

Lateral wall 62 extends, away from axis XX', with a convex rounded surface 66 in form of an arc of a circle with radius R3, which is referred to as a re-entrant, leading to an inclined plane 68 linked to a concave inflection surface 69 connected to a substantially plane surface 70. This plane surface continues by an outer convex surface 72 in form of an arc of a circle with radius R5 that extends to a plane surface 74 extending up to the vicinity of the cylinder wall.

The combustion chamber thus comprises two distinct zones Z1 and Z2 at which mixing of the oxidizer therein (air, supercharged or not, or mixture of air and recirculated burnt gas) with the fuel coming from the injector, as well as combustion of the fuel mixture which is formed.

Zone Z1, limited by projection 48, torus 64 at the bowl bottom, wall 62 and convex rounded surface 66, forms the lower zone of the combustion chamber associated with lower sheet 36 of fuel jets of axis C1. Zone Z2, limited by inclined plane 68, concave surface 69, substantially plane surface 70, convex surface 72, plane surface 74, the peripheral inner wall of the cylinder and cylinder head 12, forms the upper zone of this chamber associated with upper sheet 38 of fuel jets of axis C2.

In this configuration, the bowl comprises, for a piston position close to the top dead center:

- a bowl bottom outside diameter FD with a radius between axis XX' and point M which is the lowest point of the bowl that is at the intersection between the surfaces of radius R1 and R2;
- a bowl having an opening diameter BD with a radius in the vicinity of the bowl bottom and corresponding to a distance taken between axis XX' and the furthest point of outer concave surface 60;
- a neck diameter GD with a radius corresponding to the distance between axis XX' and vertical wall 62 limiting the outlet section of this bowl;
- an upper injection diameter ID1 with a radius corresponding to the distance between axis XX' which is the starting of inflection surface 69 at point P between inclined plane 68 and concave surface 66 by limiting a length L6 of jets 38 between the origin T2 of axis C2 of the jets on the axis of the injector nozzle and point P, meeting the formula $ID1/\sin(a2)$;
- a developed length of the diametral half section Cb of the bowl, having a length from the intersection of the projection top with axis XX' to the cylinder wall;
- a projection height H between the bowl bottom at point M and the top of the projection;
- a bowl height L between the bowl bottom at point M and plane surface 74;
- a junction height L3 corresponding to the extension of lateral wall 62 considered between the end of outer rounded surface 60 at point N and the start of outer rounded surface 66;
- a height L4 between point P and point M;
- an angle of inclination a3 with respect to a vertical for inclined flank 54;
- an angle of inclination a4 formed by principal axis C1 of the fuel jets of lower sheet 36 impacting the torus with the tangent to impact point F by limiting a length L5 of jets 40 between the origin T1 of axis C1 of the jets on the axis of the injector nozzle and point F. This length L5 meets formula $ID2/\sin(a1)$, with ID2 corresponding to a lower injection diameter with a radius that corresponds to the distance between axis XX' and point F;
- an angle of inclination a5 considered at the tangency of outer rounded surface 60 with lateral wall 62 at point N;
- an angle of inclination a6 with respect to the horizontal and the tangent to substantially plane wall 70; and
- an angle of inclination a7 with respect to the horizontal and inclined plane 68 at intersection point P.

All these parameters are consider relative to a position of piston 16 in the vicinity of the top dead center that corresponds to a distance D considered between point M and the origin T2 of axis C2 of jets 42.

More precisely, this distance D is equal to the sum of height L4 and height C, height C corresponding to the axial height between origin T2 and point P. This height corresponds to formula $ID1/\tan(a2)$.

Thus, the dimension and angle parameters of this bowl meet at least one of the following conditions:

- angle a4 is greater than 80°, which amounts to passing over half the fuel jet between center B of torus 64 and the projection, and more precisely the lower part at point M, and thus to generating an aerodynamic upward motion in the torus towards the top of the cylinder;
- angle a5 must be positive and less than 90°. Preferably, it has to be of the order of 30° to 40° to direct fuel jets 40 of lower sheet 36 towards oxidizer volume S1 in order to use the oxidizer of this zone while limiting upflow of this fuel towards upper sheet 38;
- oxidizer volume S1 between fuel jets 40 of the lower sheet is minimized, in order to optimize the use of oxidizer in the chamber;

the position of the top of projection 48 is as close as possible to nozzle 32 of injector 30 to limit the volume of oxidizer under the injector that will not be impacted by the fuel jets, which again amounts to minimizing volume S1. Thus, ratio H/L is greater than 40% and preferably greater than 60%;

angle a3 is substantially equal to or greater than angle a1 of the lower sheet (−10°<a3−a1<10°. Thus, the general axis of the lower sheet jets is tangential to flank 54 of the projection. Fuel jets 40 of lower sheet 36 can thus interact with rounded surface 58 by vaporizing totally prior to impacting the piston;

oxidizer volume S2 between the two sheets is non-zero since the interaction between the sheets is detrimental to the pollution. Volume S2 however needs to be minimized. Therefore, junction length L3 between the torus and re-entrant 66 (convex rounded surface of radius R3) has to be such that L3/(2*length of R2)<1 or (L3/length of R2<2) in order to ensure that oxidizer volume S2 available between the upper 38 and lower 36 sheets is low in relation to the fuel volume generated by the jets of the lower sheet, second combustion zone Z2, arranged in the upper part of the piston that starts from re-entrant 66, is intended for fuel jets 42 of upper sheet 38;

the combustion volume of zone Z2 is at least equal to one tenth of the total volume of the bowl;

the area referred to as compression area is formed by inclined plane 68, concave surface 69, plane surface 70, convex surface 72 and plane surface 74;

angle a6 ranges between 10° and 75°, which allows bursting fuel jets 42 to create an aerodynamic motion above the piston and additionally to use the oxidizer in the compression area. The aerodynamic motion allows better fuel/oxidizer mixing above the piston, notably during expansion, thus promoting oxidation of the burnt gas;

in order to promote the distribution of the fuel from jets 42 in the compression area, a guiding surface 68 is provided between re-entrant 66 and surface 70. This guiding surface can be rounded in the continuation of the re-entrant or substantially plane. The purpose of this guiding surface is to concentrate fuel jets 42 and to guide them towards convex surface 72. Thus, the guiding surface has an angle a7 at intersection point P whose difference with respect to sheet angle a2 is less than 45°;

the position of inflection surface 69 is such that distances L5 and L6 are approximately of the same order (0.5<L5/L6<2). Thus, advantageously, the fuel jets will impact substantially at the same time the piston in the torus and the inflection zone respectively;

diameter ID1 must be such that ID1/GD>1 and ID1<(GD+(Cb−GD)*2/3). This allows fuel jets 42 to optimize the aerodynamics above the piston.

Furthermore, ratio BD/L is less than 6, preferably less than 4;
ratio R2/R1 is less than 1, preferably less than 0.6;
ratio FD/BD is less than 1;
ratio Cb/BD is less than 2 to maintain complete vaporization of the fuel and to prevent wetting of the cylinder wall;
ratio GD/BD ranges between 0.7 and 1 for the torus aerodynamics and upflow of the fuel jets;
ratio H/L is greater than 40%, preferably greater than 60% to minimize the oxidizer volume between the injector nozzle and the projection;
ratio L5/L6 ranges between 0.5 and 2 for the impact of the two sheets at the same time;
A1 ranges between 40° and 130° with a1=A1/2;
A2 ranges between 130° and 180° with a2=A2/2;
a3 is substantially equal to a1;
a4 is greater than 80°;
a5 ranges between 0° and 90°, preferably substantially between 30° and 40°;
a6 ranges between 15° and 75°;
a7-a2 is less than 45°;
ratio ID I/GD is greater than 1; and
ID1 is less than (GD+(Cb−GD)*2/3).

Thus, this bowl parametrization causes the fuel jets of lower sheet 36 to directly target torus 64 and not directly impact re-entrant 66.

Therefore, combustion of the lower fuel/oxidizer mixture occurs essentially in the torus volume, whereas combustion of the upper fuel/oxidizer mixture occurs essentially in the compression area and above the piston.

Furthermore, the interaction of the upper sheet jets with the lower sheet jets is limited, which allows the fuel/oxidizer mixture to be homogenized while meeting mechanical strength constraints at high load.

Figure 3:
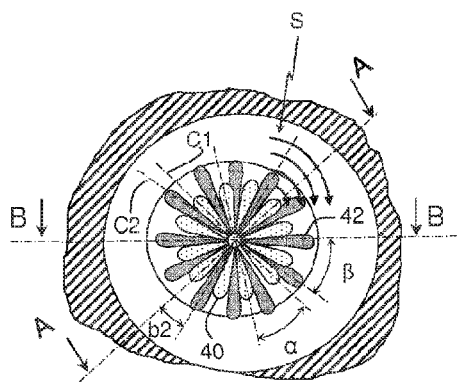
FIG. 3 is a local cross-sectional view of the bowl during the initial fuel injection phase.

FIG. 3 in association with FIG. 1 illustrates an example of fuel injection into combustion chamber 34.

As already mentioned, injector 30 carries, in the region of nozzle 32 thereof, injection orifices 33 from which the fuel jets extend radially (see FIG. 1). These orifices have at least two series of radial fuel injection orifices 33*a* and 33*b* arranged substantially parallel to one another. The orifices are positioned circumferentially on the nozzle and the series are arranged one above the other. One of the series comprises orifices 33*a* through which the fuel is injected by forming lower jet sheet 36 of axis C1 for mixing zone Z1. The other series comprises orifices 33*b* for injection of the fuel forming upper jet sheet 38 of axis C2 for mixing zone Z2.

In this configuration, radial injection of the fuel jets occurs in a radial direction starting from the injector and extends away therefrom towards the walls of the combustion chamber, which corresponds to axes C1 and C2.

Of course, without departing from the scope of the invention, the diameters of orifices 33*a* and 33*b* can be different. By way of example, the diameter of orifices 33*a* can be larger than the diameter of orifices 33*b*. Since the injection pressure is identical in the region of the injector nozzle, this results in two fuel jet sheets with different flow rates.

The fact that the two combustion zones Z1 and Z2 operate independently also allows the number of orifices of the two sheets to be selected independently.

Knowing that swirl ratio Ns in zone Z1 is always greater than swirl ratio Ns in zone Z2, a larger number of holes can notably be used for upper sheet 38 because the jet-jet interactions of a single sheet due to the swirling flow of the gaseous fluid are lower.

Thus, the goal is to a greater the number of orifices N of the various sheets so as to promote the mixing and combustion rate.

For the lower sheet, it is proposed to correlate swirl ratio Ns in zone Z1 and the number of orifices for the jets of this sheet Ninf such that −4·Ns+14≤Ninf≤−4·Ns+16.

Concerning upper sheet 38, the correlation depends on the number of orifices for the fuel jets of this sheet Nsup, with −4·Ns+145 Nsup−4·Ns+18.

Considering that the swirl ratio in zone Z1 is always greater than the swirl ratio in zone Z2, a larger number of injection orifices can notably be used for the upper sheet because the jet-jet interactions of this sheet due to the swirling flow of the gaseous fluid are lower.

Furthermore, the fact that the two combustion zones Z1 and Z2 operate independently allows the number of injection orifices of the two sheets to be selected independently.

Mixing of the fuel and the oxidizer is then mainly achieved through entrainment of the oxidizer by the fuel jets, the contribution related to the swirling motion remaining low and being kept only to complete the mixing process with large-scale stirring upon expansion of the piston.

With additional reference to FIG. 3 that illustrates, by way of non limitative example, an injector comprising 24 injection orifices with 12 orifices 33a and 12 orifices 33b, jets 40 of sheet 36 are evenly distributed circumferentially while being separated each by an angle α substantially equal to 30° with respect to their axis C1 and jets 42 of sheet 38 are also evenly distributed circumferentially while being separated each by an angle β substantially equal to 30° with respect to their axis C2.

Furthermore, orifices 33a of the lower sheet and orifices 33b of the upper sheet here have an angular offset, denoted by b2, which is here substantially equal to the half angle between two jets of the same sheet.

This angular offset affords the advantage of reducing the risk of interaction between the two sheets when the fuel from the lower sheet leaves the bowl bottom to flow towards the upper part of zone Z1 in the final injection phase.

One specific feature of this injection system is that it uses a large number of ports, not necessarily equal for each sheet, with a low swirl number, ideally below 1.5, so as to achieve mixing of the fuel and of the gaseous fluid as quickly as possible, predominantly during the injection process.

Mixing is then mainly achieved through entrainment of the gaseous oxidizer by the fuel jets, the contribution related to the swirling motion remaining low and being kept only to complete the mixing process through large-scale stirring upon expansion of the piston.

Thus, during fuel injection, the oxidizer is admitted to combustion chamber 34 with a swirling motion S and a swirl ratio preferably below 1.5.

By way of non-limitative example, there are here 24 fuel jets equally distributed among the two sheets (12 jets for the lower sheet and 12 jets for the upper sheet) and angle b2 is 15°.

Figure 3A:
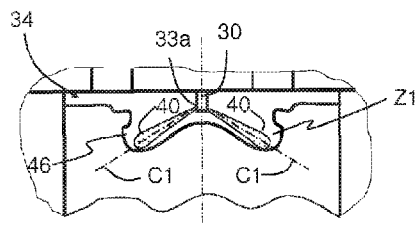
FIGS. 3A and 3B are sectional views along lines AA and BB of FIG. 3 respectively.
Figure 3B:
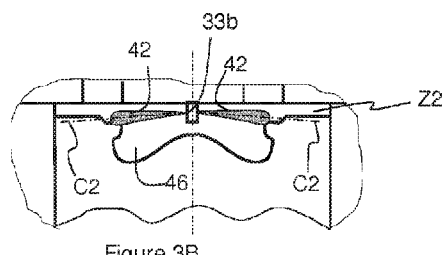

Fuel jets 40 of the lower sheet are sent towards the bottom of bowl 46 in zone Z1 (FIG. 3A—sectional view along line AA of FIG. 3) while jets 42 of the upper sheet are oriented towards the top of the bowl in zone Z2 (FIG. 3B—sectional view along line BB of FIG. 3).

Figure 4:
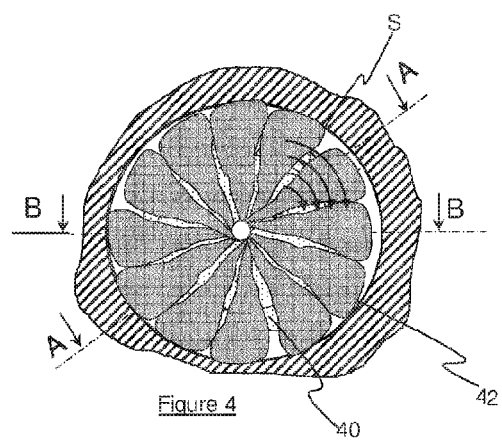
FIG. 4 is another local cross-sectional view of the bowl during the final fuel injection phase.
Figure 4A:
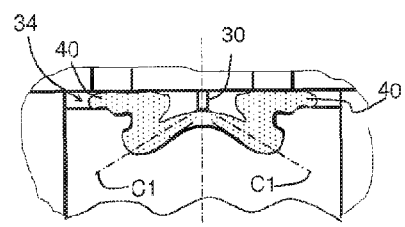
FIGS. 4A and 4B are sectional views along lines AA and BB of FIG. 4 respectively.
Figure 4B:
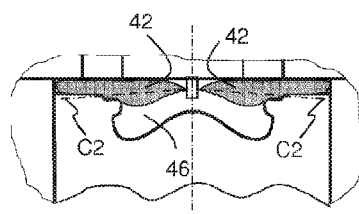

During the final injection phase, it can be observed that, with a moderate swirl number Ns, ideally of the order of 1, the fuel jets of the two sheets do not overlap (FIG. 4) and the combustion has used almost all of the oxidizer present in zone Z1 (FIG. 4A—sectional view along line AA of FIG. 4) and in zone Z2 (FIG. 4B—sectional view along line BB of FIG. 4).

The variant of FIGS. 5, 5A, 6 and 6A differs from FIGS. 3 and 4 in that orifices 33a and 33b of the two sheets are positioned one above the other (FIG. 5, zero offset b2).

In this configuration, fuel jets 40 of the lower sheet are sent towards the bottom of bowl 46 in zone Z1 while jets 42 of the upper sheet are oriented towards the top of the bowl in zone Z2 without overlap of the jets (FIG. 5A—sectional view along line AA of FIG. 5).

Similarly, it can be observed that, during the final injection phase with a moderate swirl number Ns, ideally of the order of 1, the fuel jets of the two sheets do not overlap (FIG. 5) and the fuel has used almost all of the oxidizer present in zones Z1 and Z2 (FIG. 6A—sectional view along line AA of FIG. 6).

Thus, using an injection system with a large number of ports favors fast mixing between the injected fuel and the oxidizer through the mechanism of entrainment in the jets. However, the number of ports needs to be adapted in each zone (Z1 and Z2) to the swirl number Ns (via the two options provided, see FIG. 7) and to the shape of the piston (associated sheet angles).

This fast mixing mechanism allows higher homogenization, thus limiting during combustion the generation of pollutants such as soot in highly fuel-rich zones or NOx in fuel-lean zones. This non-generation of pollutants allows the combustion efficiency to be increased and therefore the specific consumption of this type of engine to be decreased.

The invention claimed is:

1. A compression-ignition direct-injection internal-combustion engine comprising:
    at least one cylinder, a cylinder head carrying fuel injection, a piston sliding in each of the at least one cylinder, a combustion chamber delimited on one side by an upper face of the piston comprising a projection extending in a direction of the cylinder head and disposed in a center of a concave bowl with at least two mixing zones, the fuel injection comprising one injector projecting fuel in at least upper and lower fuel jet sheets having different sheet angles with a lower sheet jet axis intersecting a lower mixing zone and an upper sheet jet axis intersecting an upper mixing zone, the fuel injection comprising an upper row of injection orifices and a lower row of injection orifices below the upper row of injection orifices, a number of injection orifices of the upper row of injection orifices being greater than a number of injection orifices of the lower row of injection orifices, and the number of orifices of each row is greater than or equal to 4Ns+14 and for the lower row is less than or equal to 4Ns+16 and for the upper row is less than or equal to 4Ns+18 and Ns is a swirl number of the engine.

2. An engine as claimed in claim 1, wherein the swirl number Ns is less than 1.5.

3. A engine as claimed in claim 2, comprising injecting fuel jets with the upper fuel jet sheet having an angular offset with respect to injecting fuel jets with the lower fuel jet sheet.

4. An engine as claimed in claim 1, wherein the swirl number Ns is less than 1.

5. A engine as claimed in claim 4, comprising injecting fuel jets with the upper fuel jet sheet having an angular offset with respect to injecting fuel jets with the lower fuel jet sheet.

6. An engine as claimed in claim 1, comprising injecting fuel jets with the upper fuel jet sheet having an angular offset with respect to injecting fuel jets with the lower fuel jet sheet.

7. A fuel injection method for a compression-ignition direct-injection internal-combustion engine comprising at least one cylinder, a cylinder head carrying fuel injection, a piston sliding in each of the at least one cylinder, a combustion chamber delimited on one side by an upper face of the piston comprising a projection extending in a direction of the cylinder head and disposed in a center of a concave bowl with at least two mixing zones, the fuel injection comprising at least one injector projecting fuel in at least upper and lower fuel jet sheets having different sheet angles with a lower sheet jet axis intersecting a lower mixing zone and an upper sheet jet axis intersecting an upper mixing zone, the fuel injection comprising an upper row of injection orifices and a lower row of injection orifices below the upper row of injection orifices, a number of injection orifices of the upper row of injection orifices being greater than a number of injection orifices of the lower row of injection orifices, and the number of orifices of each row is greater than or equal to 4Ns+14 and for the lower row is less than or equal to 4Ns+16 and for the upper row is less than or equal to 4Ns+18 and Ns is a swirl number of the engine comprising:
- injecting fuel in at least two fuel jet sheets with different sheet angles; and
- the injecting of fuel occurs from two rows of injection orifices arranged one above the other.

8. A method as claimed in claim 7, wherein a minimum compression ratio is 13.5 and a maximum compression ratio is 16.5.

9. A method as claimed in claim 8, comprising injecting fuel jets with the upper fuel jet sheet having an angular offset with respect to injecting fuel jets with the lower fuel jet sheet.

10. A method as claimed in claim 7, wherein the swirl number Ns is less than 1.5.

11. A method as claimed in claim 10, comprising injecting fuel jets with the upper fuel jet sheet having an angular offset with respect to injecting fuel jets with the lower fuel jet sheet.

12. A method as claimed in claim 7, wherein the swirl number Ns is less than 1.

13. A method as claimed in claim 7, comprising injecting fuel jets with the upper fuel jet sheet having an angular offset with respect to injecting fuel jets with the lower fuel jet sheet.

* * * * *